UNITED STATES PATENT OFFICE 2,517,416

PREPARATION OF ESTERS

William W. Prichard, Wilmington, Del., assignor to E. I. du Pont de Nemours & Company, Wilmington, Del., a corporation of Delaware No Drawing. Application June 14, 1946, Serial No. 676,858

9 Claims. (Cl. 260—497)

This invention relates to esters and more particularly to the synthesis and production of esters having two acyloxy groups on one and the same carbon atom.

Heretofore such esters have been prepared by the reaction of dihalides, e. g., alkylidene dihalides, with the salts of appropriate acids (Wicke, Ann., 102, 366 (1857)), or by the reaction of aldehydes with anhydrides, usually in the presence of catalysts and heat (Geuther, Ann. 106, 249 (1858)). The commercial exploitation of this class of compounds has, however, been limited because of the unavailability and high cost of many of the dihalides and aldehydes.

This invention has as an object the provision of a process for the preparation of esters having two acyloxy groups on the same carbon. A further object is to provide, relatively cheaply, alkylidene esters from readily available low cost materials. Another object is to provide relatively stable aldehyde derivatives. Other objects will appear hereinafter.

These objects are accomplished by the following invention wherein a mixture of carbon monoxide and hydrogen is reacted, in the presence of a hydrogenation catalyst, with an intimate mixture of an acid anhydride and an olefinic unsaturated compound, the ethylenic carbons of said olefinic unsaturated compound being free of halogen and at least one of the ethylenic carbons being attached to at least one hydrogen atom.

The reaction may be illustrated by the following equation using the mono-olefinic reaction component, isobutylene, with acetic anhydride as the acid anhydride:

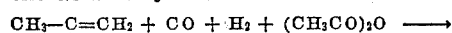

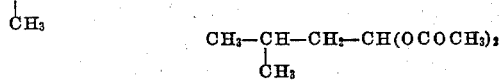

or

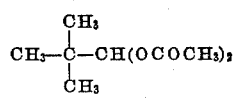

The conversion is preferably effected by heating the reactants within the temperature range of 80 to 220° C. under pressures of 20 to 1200 atmospheres or even higher, in the presence of a hydrogenation catalyst selected from the metals of group VIII of the periodic table. Cobalt, nickel and ruthenium are especially effective.

The more detailed practice of the invention is illustrated by the following examples, in which parts are given by weight unless otherwise indicated.

Example I

A silver-lined autoclave was charged with 5 parts of a finely divided cobalt-copper-thoria (100—3—18) catalyst, 41 parts of cyclohexene, and 100 parts of acetic anhydride. An equimolar mixture of carbon monoxide and hydrogen was then added under pressure. The reactor was agitated and heated to 125° C., the pressure being maintained in the range 1100-1600 lbs./sq. in. by the injection of additional equimolar carbon monoxide/hydrogen mixture as required. The sum of the pressure drops over the 4-hour period was about 1100 lbs./sq. in. The reactor was then cooled, the pressure released, and the contents removed from the reactor and filtered to separate the catalyst. By fractional distillation of the filtrate under diminished pressure there was obtained 61 parts of hexahydrobenzylidene diacetate boiling at 86–87.5° C./1 mm., $d_4^{25}$, 1.0559. Hydrolysis of this ester with either acid or alkali gives hexahydrobenzaldehyde. The 2,4-dinitrophenylhydrazone prepared from this hexahydrobenzaldehyde melted at 174–176° C. and gave no depression of melting point when mixed with the 2,4-dinitrophenylhydrazone derivative of an authentic sample of the aldehyde.

The cobalt-copper-thoria catalyst used in the above reaction was prepared as follows:

To a solution of 493.8 parts of cobalt nitrate hexahydrate [Co(NO$_3$)$_2$.6H$_2$O], 13.91 parts of copper nitrate hexahydrate [Cu(NO$_3$)$_2$.6H$_2$O], and 37.61 parts of thorium nitrate tetrahydrate [Th(NO$_3$)$_4$.4H$_2$O] in 6000 parts of water was added in a thin stream a solution of 315 parts of ammonium carbonate monohydrate

[(NH$_4$)$_2$CO$_3$.H$_2$O]

in 2000 parts of water and the whole was allowed to stand at 25° C. for 15 hours. The resulting finely divided precipitate was washed by decantation four times with four portions (2000 parts) of water, filtered and dried at 110° C. for 50 hours. The product was then pelleted into $\tfrac{3}{16}$″ pills, charged into a furnace, and reduced in an atmosphere of hydrogen at the following temperatures:

| | 200° C. | 250° C. | 300° C. | 350° C. | 400° C. |
|---|---|---|---|---|---|
| Time, hours | 1 | 1 | 2 | 1.5 | 35 |

The reduced catalyst was discharged under nitrogen into redistilled cyclohexane (yield 76 per cent of theory) and was found to consist of approximately 100 parts cobalt, 3 parts copper and 18 parts thoria.

*Example II*

Cyclohexene was reacted with acetic anhydride, carbon monoxide, and hydrogen under substantially the conditions of Example I, employing two parts of ruthenium dioxide in place of the cobalt-copper-thoria catalyst, and at a reaction temperature of 140° C. 22% conversion of the cyclohexene to hexahydrobenzylidene diacetate was thus obtained.

*Example III*

Fifty-four (54) parts of 1-vinyl-3-cyclohexene, 125 parts of acetic anhydride and 5 parts of finely divided cobalt-copper-thoria catalyst prepared as described in Example I were introduced into a silver-lined reactor. The reactor was agitated and maintained at 150° C. for 4 hours under a pressure of 1500-1800 lbs./sq. in. provided by the injection, as needed, of an equimolar mixture of carbon monoxide and hydrogen. The sum of the pressure drops occurring during the reaction period was about 1500 lbs./sq. in. The reactor was then cooled, the pressure released, and the contents removed and filtered to separate the catalyst. Fractional distillation of the filtrate under diminished pressure gave 14 parts of the diacetate of a nine carbon saturated monoaldehyde boiling at 87-90° C./0.25 mm.

Analysis: Calculated for $C_{13}H_{22}O_4$: C, 64.46; H, 9.09. Found: C, 64.82, 64.72; H, 8.25, 9.09. The stillpot residue from the distillation contained a mixture of isomeric tetracetates of ten carbon dialdehydes, resulting from carbonylation (introduction of the carbonyl group into the molecule) at both of the double bonds of the vinylcyclohexene.

*Example IV*

In a manner similar to that outlined in the previous examples, 100 parts of methyl oleate, 51.7 parts of acetic anhydride, and 5 parts of a cobalt-copper-thoria catalyst prepared as described in Example I were reacted with an equimolar mixture of carbon monoxide and hydrogen under 1500-1800 lbs./sq. in. at 150° C. for 4 hours. Nineteen (19) parts of the diacetates of an isomeric mixture of methyl formylstearates [methyl 9- and 10-(diacetoxymethyl)stearates] distilling at 190-205° C./3.5 mm. was obtained.

Although in the foregoing examples certain specific conditions of temperature, pressure, reaction periods, reactants and reactant concentrations have been recited, it is to be understood that these values are subject to considerable variation within the scope of this invention.

Although this invention has been illustrated with acetic anhydride, acid anhydrides, i. e. diacyl oxides, in general can be employed. For example, the acid anhydrides of monobasic and dibasic acids may be used, although those derived from the monobasic aliphatic and aromatic acids are preferred and particularly those from the aliphatic acids, e. g., propionic, butyric, valeric, etc. The acid anhydrides of benzoic, phthalic, octoic, dodecanoic, hexahydrobenzoic, hexahydro-o-phthalic, etc. may also be employed.

The process of this invention is generally applicable to olefinic unsaturated compounds having two carbons united by an olefinic linkage, at least one of said carbons being attached to hydrogen and neither of said carbons being attached to halogen. For the most part the compounds applicable in this process can be represented by the formula:

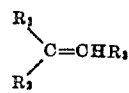

wherein $R_1$ and $R_2$ are hydrogen or monovalent hydrocarbon radicals selected from the group consisting of alkyl, alkenyl, cycloalkenyl, aryl, and aralkyl radicals. The alkyl radical preferably contains from one to sixteen carbon atoms, the alkenyl from two to sixteen carbons, the cycloalkenyl radical is cyclopentenyl or cyclohexenyl, the aryl radical is phenyl and the aralkyl radical is benzyl. $R_3$ is hydrogen, alkyl of one to sixteen carbon atoms, aryl (preferably phenyl), alkoxy, (preferably of one to four carbon atoms), carboalkoxyalkyl (preferably carbomethoxy- and carbethoxyheptyl, and carbomethoxy- and carboethoxyoctyl), carboxy, or carboalkoxy, preferably derived from alkanols of one to five carbon atoms. The $R_1$ and $R_2$, or $R_1$ and $R_3$ in the above formula may also be combined to form an alicyclic ring.

Illustrative of the olefinic unsaturated compounds which may be employed in the process of this invention are the following: ethylene, propylene, the butylenes, amylenes, octenes, decenes, dodecenes, octadecenes, the polysubstituted ethylenes, e. g. 2-methylbutene-2; vinyl methyl ether, vinyl propyl ether, vinyl acetate, vinyl propionate; the unsaturated acids, e. g., crotonic, cinnamic, acrylic, methacrylic, abietic, undecylenic, oleic, and linoleic acids, and the esters, e. g., the methyl and ethyl esters of these acids; the terpenes, e. g. pinene and dipentene; the unsaturated naphthenes; the alkyl cyclohexenes and cyclopentenes; the aryl ethylenes, e. g. benzylethylene; diolefines, e. g. diallyl, 1,4-octadiene, butadiene, and alkyl butadienes, such as piperylene.

The olefinic hydrocarbons aliphatic in character, i. e. the acyclic aliphatic and the alicyclic hydrocarbons, are a preferred class because of the availability of these non-aromatic hydrocarbons. The olefinic hydrocarbons having but one unsaturation, and that olefinic, have the advantage of yielding a reaction mixture readily separable into its components.

Various mixtures of carbon monoxide and hydrogen may be employed. The molar ratio of carbon monoxide to hydrogen may range from about 1:4 to 4:1. In general, however, it is preferable to keep the molar ratio of the two gases at about 1:1. Mixtures of acid anhydride reactants and also mixtures of olefinic unsaturated compounds may be used. The proportion of the two classes of reactants may vary although it is preferred to use at least two molecular equivalents of the acid anhydride for each double bond of the olefinic unsaturated compound.

Satisfactory operating pressures include the range between 20-1200 atm. or even higher e. g., 1500 atmospheres. The most satisfactory pressure depends on such factors as the nature of the olefinic unsaturated compounds, the acid anhydrides, temperature, catalyst, etc. In general it has been found convenient to operate at pressures between 80-500 atm. While operating temperatures of 80-300° C. may be employed a range of 80-220° C. is desirable.

Hydrogenating catalysts, and particularly those comprising metals of group VIII of the periodic table of elements, are suitable for the production of aldehyde diesters by the process of this invention. More particularly, hydrogenation catalysts in which cobalt, ruthenium, or nickel is the essential active constituent are preferred. The activity of these catalysts for the purposes of this invention may be enhanced by such oxides as those of thorium, magnesium, chromium, aluminum, manganese, etc. They may be employed in solid form either alone or with a supporting material such as kieselguhr, magnesia, alumina, etc. It is also possible to employ these catalysts for the purposes of this invention in suspension in an inert liquid such as a saturated hydrocarbon, e. g. cyclohexane, etc.

The products of this invention are useful for various commercial purposes. They may be used as intermediates for the preparation of pharmaceuticals, as solvents, in perfumes, and as pest control agents, as for example in insecticides, bactericides and fungicides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of esters having two acetoxy groups on one carbon which comprises reacting, in the presence of a cobalt hydrogenating catalyst, carbon monoxide and hydrogen at 80–300° C. and a pressure of 80–500 atmospheres with acetic anhydride and a non-aromatic hydrocarbon having one unsaturation and that olefinic and having hydrogen on unsaturated carbon.

2. Process for the preparation of esters having two acetoxy groups on one carbon which comprises reacting, in the presence of a cobalt hydrogenating catalyst, carbon monoxide and hydrogen at 80–300° C. and a pressure of 20–1500 atmospheres with acetic anhydride and a non-aromatic hydrocarbon having one unsaturation and that olefinic and having hydrogen on unsaturated carbon.

3. Process for the preparation of esters having two acetoxy groups on one carbon which comprises reacting carbon monoxide and hydrogen at 80–300° C. and 80–500 atmospheres in the presence of a cobalt hydrogenating catalyst with acetic anhydride and an olefinic hydrocarbon aliphatic in character.

4. Process which comprises reacting cyclohexene with carbon monoxide, hydrogen, and acetic anhydride at 80–220° C. and 80–500 atmospheres in the presence of a cobalt hydrogenation catalyst and isolating the hexahydrobenzylidene diacetate.

5. Process which comprises reacting acetic anhydride, carbon monoxide, and hydrogen at 80–300° C. and 80–1200 atmospheres in the presence of a catalyst of the class consisting of cobalt hydrogenation catalysts and ruthenium hydrogenation catalysts with an olefinic compound having hydrogen on a carbon of the olefinic group and no halogen thereon and isolating the aldehyde diacetate formed.

6. Process of claim 5 where the catalyst is a cobalt catalyst.

7. Process which comprises reacting carbon monoxide, hydrogen, and the acid anhydride of an aliphatic monocarboxylic acid at 80–300° C. and 80–1200 atmospheres in the presence of a catalyst of the class consisting of cobalt hydrogenation catalysts and ruthenium hydrogenation catalysts with an olefinic compound having hydrogen on a carbon of the olefin group and no halogen thereon.

8. Process of claim 7 wherein the catalyst is a cobalt catalyst.

9. Process which comprises reacting carbon monoxide, hydrogen and the acid anhydride of an organic carboxylic acid at 80–300° C. and 80–1200 atmospheres in the presence of a catalyst of the class consisting of cobalt hydrogenation catalysts and ruthenium hydrogenation catalysts with an olefinic compound having hydrogen on carbon of the olefinic group and no halogen thereon.

WILLIAM W. PRICHARD.

REFERENCES CITED

The following references are of record in the file of this patent:

UNITED STATES PATENTS

| Number | Name | Date |
|---|---|---|
| 2,312,193 | Richter | Feb. 23, 1943 |
| 2,327,066 | Roelen | Aug. 17, 1943 |
| 2,400,727 | Yale | May 21, 1946 |
| 2,415,102 | Landgraf et al. | Feb. 4, 1947 |

FOREIGN PATENTS

| Number | Country | Date |
|---|---|---|
| 393,267 | Great Britain | May 26, 1933 |